United States Patent
Iimura et al.

(10) Patent No.: US 6,236,404 B1
(45) Date of Patent: May 22, 2001

(54) PERSPECTIVE PROJECTION CALCULATION DEVICES AND METHODS

(75) Inventors: Ichiro Iimura, Hitachi; Yasuhiro Nakatsuka, Koganei; Jun Satoh, Musashino, all of (JP); Takashi Sone, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/536,757

(22) Filed: Mar. 28, 2000

Related U.S. Application Data

(63) Continuation of application No. 08/745,858, filed on Nov. 8, 1996, now Pat. No. 6,043,820.

(30) Foreign Application Priority Data

Nov. 9, 1995 (JP) .................................................. 7-290949

(51) Int. Cl.$^7$ .................................................. G06F 15/00
(52) U.S. Cl. ............................................................ 345/427
(58) Field of Search .................................... 345/419, 421, 345/425, 426, 427, 422, 441, 440

(56) References Cited

U.S. PATENT DOCUMENTS

| | | | |
|---|---|---|---|
| 5,594,845 | 1/1997 | Florent et al. | 395/127 |
| 5,616,031 | * 4/1997 | Logg | 434/38 |
| 5,659,671 | 8/1997 | Tannebaum et al. | 395/126 |
| 6,014,472 | * 1/2000 | Minami et al. | 345/426 |

FOREIGN PATENT DOCUMENTS 3-198172   8/1991   (JP) .

OTHER PUBLICATIONS

J. Pineda, "A Parallel Algorithm for Polygon Rasterization", *Computer Graphics*, vol. 22, No. 4, Aug. 1988, pp. 17–20.

* cited by examiner

*Primary Examiner*—Phu K. Nguyen
(74) *Attorney, Agent, or Firm*—Antonelli, Terry, Stout & Kraus, LLP

(57) ABSTRACT

An image processing system for perspectively projecting a triangle defined in a three-dimensional space onto a two-dimensional space and shading the triangle in the two-dimensional space, includes a memory which stores at least inverses of depth coordinates; a CPU which calculates a plane slope element coefficient which implies a plane slope element of the triangle defined in the three-dimensional space, and calculates an interpolation coefficient from the plane slope element coefficient; and a graphics processor which makes a perspective correction using the interpolation coefficient and inverses of depth coordinates stored in the memory. The graphics processor may output inverses of depth coordinates for storage in the memory in advance, and may output a result of the perspective correction for storage in the memory. The image processing system may also include a display for displaying a result of the perspective correction.

8 Claims, 16 Drawing Sheets

|  |  | VERTEX v0 | VERTEX v1 | VERTEX v2 |
|---|---|---|---|---|
| pdc COORDINATES 1170 | x | x0 | x1 | x2 |
|  | y | y0 | y1 | y2 |
|  | z | z0 | z1 | z2 |
| rzc COORDINATES 1180 | x | xr0 | xr1 | xr2 |
|  | y | yr0 | yr1 | yr2 |
|  | z | zr0 | zr1 | zr2 |
| vrc COORDINATES 1110 | x | xv0 | xv1 | xv2 |
|  | y | yv0 | yv1 | yv2 |
|  | z | zv0 | zv1 | zv2 |
| TEXTURE COORDINATES tx | s | s0 | s1 | s2 |
|  | t | t0 | t1 | t2 |
| LIGHT SOURCE INTENSITY ATTENUATION RATE | Latt | Latt0 | Latt1 | Latt2 |
| REGULAR MODEL COORDINATES | u | u0 | u1 | u2 |
|  | v | v0 | v1 | v2 |
|  | w | w0 | w1 | w2 |

PROJECTION PLANE :
zv=-1 (∴VIEWPOINT-PROJECTION PLANE DISTANCE : d=1)
ERASURE POINT COORDINATES (pdc) : (xc,yc)

$wv = right-(-left)-1$
$hv = top-(-bottom)-1$
$zoomx = w/(wv/near)$
$zoomy = h/(hv/near)$ $xr = xv/\{(-zv)/d\}$
$yr = [yv/\{(-zv)/d\}]$
$zr = near/(-zv)$
$wr = wv/near$
$hr = hv/near$ $xr = (x-xc)/zoomx$
$yr = (y-yc)/zoomy$
$zr = recZ = 1/z$
$wr = w/zoomx$
$hr = h/zoomy$

FIG. 13

INTERPOLATION EXPRESSION recZ(=$z_r$)INTERPOLATION

2521(e) $\quad$ recZ = recZx · $x_r$ + recZy · $y_r$ + recZc
$\phantom{2521(e)\quad}$ = recZx · {(x-xc)/zoomx} + recZy · {(y-yc)/zoomy} + recZc s-INTERPOLATION (GEOMETRIC NUMERICAL VALUES OTHER THAN recZ ARE REPRESENTED BY AN s-CALCULATING SYSTEM)

2522s(h) $\quad$ s = Sx · $x_r$ · $z_v$ + Sy · $y_r$ · $z_v$ + Sz · $z_v$
$\phantom{2522s(h)\quad}$ = (Sx · $x_r$ + Sy · $y_r$ + Sz) · $z_v$
$\phantom{2522s(h)\quad}$ = [Sx · {(x-xc)/zoomx} + Sy · {(y-yc)/zoomy} + Sz] · {near/(-recZ)}

| | |
|---|---|
| xc, yc : | ERASURE POINT COORDINATES (pdc) |
| zoomx, zoomy : | ZOOM MAGNIFICATIONS |
| near : | DISTANCE TO FRONT CLIPPING PLANE |
| recZx, recZy, recZc, | DEPTH COORDINATE INTERPOLATION COEFFICIENTS |
| Sx, Sy, Sz : | TEXTURE COORDINATE s-COMPONENT INTERPOLATION COEFFICIENTS |

FIG. 14

LUMINANCE CALCULATION EXPRESSION

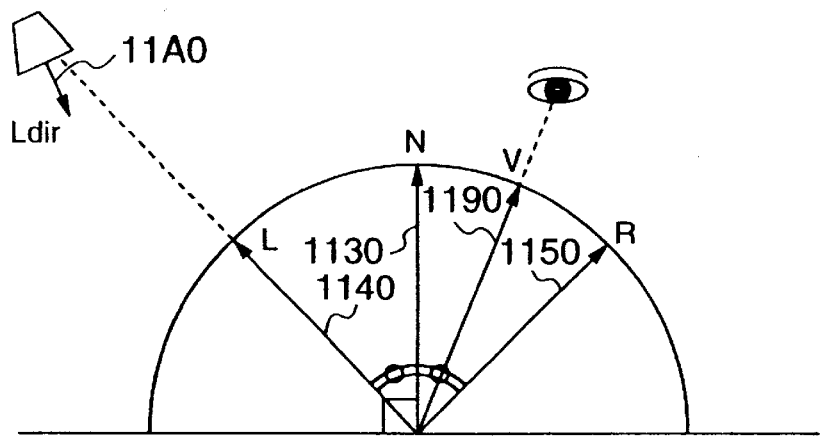

$C = Ca + Ce + \sum_{T}^{\text{THE NUMBER OF LIGHT SOURCES}} Ci$ $Ca + Ce = (Ra + Re, Ga + Ge, Ba + Be), Ra = Kar \times Rglobal$ (WHICH APPLIES LIKEWISE TO Ga, Ba)

$Ci = (Ri, Gi, Bi), Ri = Rai + Rdi + Rsi$ (WHICH APPLIES LIKEWISE TO Gi, Bi)

$Rai = Kar \times Lrai \times Rtel \times Latti \overset{Lconc}{\times} (-Ldiri \cdot Li)$ $Rdi = Kdr \times Lrdi \times Rtel \times Latti \overset{Lconc}{\times} (-Ldiri \cdot Li) \times (N \cdot Li)$ $Rsi = \underline{Ksr \times Lrsi} \times Rtel \times Latti \overset{Lconc}{\times} (-Ldiri \cdot Li) \overset{Sconc}{\times} (V \cdot Ri)$

IN-PLANE
CONSTANTS

WHERE C IS A COLOR; Ra+Re IS THE WHOLE AMBIENT LIGHT COMPONENT + LIGHT EMISSION COMPONENT OF THE MATERIAL; Rai IS THE AMBIENT REFLECTIVE COMPONENT OF THE LIGHT SOURCE; Rdi IS THE DIFFUSIVE REFLECTIVE COMPONENT OF THE LIGHT SOURCE; Rsi IS THE SPECULAR REFLECTIVE COMPONENT OF THE LIGHT SOURCE; Kar IS THE AMBIENT REFLECTION COEFFICIENT OF THE MATERIAL; Kdr IS THE DIFFUSIVE REFLECTION COEFFICIENT OF THE MATERIAL; Ksr IS THE SPECULAR REFLECTION COEFFICIENT OF THE MATERIAL; i IS THE LIGHT SOURCE NO.; Lrai, Lrdi, Lrsi ARE THE LIGHT SOURCE COLORS; Latti IS THE LIGHT SOURCE INTENSITY ATTENUATION RATE; Li IS THE LIGHT SOURCE DIRECTION VECTOR; Ldiri IS THE LIGHT SOURCE VECTOR; N IS THE NORMAL VECTOR; Ri IS THE LIGHT SOURCE REFLECTION VECTOR; AND V IS THE VIEWPOINT DIRECTION VECTOR

PERSPECTIVE PROJECTION CALCULATION DEVICES AND METHODS

CROSS REFERENCE TO RELATED APPLICATION

This application is a continuation of application U.S. Pat. Ser. No. 08/745,858 filed on Nov. 8, 1996 now U.S. Pat No. 6,043,820.

BACKGROUND OF THE INVENTION

The present invention relates to figure generating systems for image processors, and more particularly to a perspective projection calculation device and method for correcting geometrical parameters of a perspectively projected three-dimensional figure.

When a perspectively projected figure, for example a triangle, is shaded, linear interpolation is generally performed for each span, using the respective vertex coordinates of a perspectively projected triangle, and geometrical parameters necessary and sufficient for shading are approximately calculated for the respective points within the perspectively projected triangle.

In order to prevent reality based on perspective projection from being impaired, secondary interpolation is performed for each span, using the vertex coordinates of the perspectively projected triangle and geometrical parameters necessary and sufficient for shading are approximately calculated for the respective points within the perspectively projected triangle.

For example, JP-A-3-198172 discloses a method of calculating geometrical parameters necessary and sufficient for shading on a plane figure in a three-dimensional space without interpolation for each span, but no specified method of calculating interpolation coefficients used for the interpolation.

A known method of interpolation for each plane is disclosed in Juan Pineda: "A Parallel Algorithm for Polygon Rasterization", *Computer Graphics*, Vol. 22, No. 4, August 1988, pp. 17–20. However, this method does not refer to processing of a perspectively projected figure.

In the above prior art, when interpolation coefficients necessary for interpolation are calculated for each span interpolation, calculations including division are required for each span. In addition, when geometrical parameters to be interpolated are different even in the interpolation for the same span, calculations including division for the interpolation coefficients are required for the respective parameters.

The effects of the perspective projection in the prior art are inaccurate and approximate.

SUMMARY OF THE INVENTION

It is therefore an object of the present invention to provide a perspective projection calculation device which is capable of reducing the number of times of division required for shading, and rapidly making an accurate correction on perspective projection for each plane.

It is another object of the present invention to provide a perspective projection calculation method which is capable of reducing the number of times of division required for shading, and rapidly making an accurate correction on perspective projection for each plane.

In order to achieve the above objects, the present invention provides a perspective projection calculation device in an image processor for perspectively projecting a triangle defined in a three-dimensional space onto a two-dimensional space and for shading the triangle in the two-dimensional space, comprising:

at least one plane slope element coefficient calculating means for calculating a coefficient which implies a plane slope element of the triangle defined in the three-dimensional space;

at least one interpolation coefficient calculating means for calculating an interpolation coefficient from the plane slope element coefficient calculated by the plane slope element coefficient calculating means; and at least one correcting means for making a perspective correction, using the interpolation coefficient.

The plane slope element coefficient may be used in common in all parameters to be interpolated.

An inverse matrix of a matrix of vertex coordinates of the triangle defined in the three-dimensional space may be used as the plane slope element coefficient.

The plane slope element coefficient, the interpolation coefficient and/or an interpolation expression including the interpolation coefficient may be used in common in the triangle defined in the three-dimensional space and/or in a perspectively projected triangle in a two-dimensional space.

The interpolation expression may involve only multiplication and/or addition.

The geometrical parameters may be interpolated in a three-dimensional space.

The interpolation expression may include a term involving a depth. More specifically, it may use the inverse of depth coordinates as geometrical parameters.

The interpolation expression may interpolate the geometrical parameters while maintaining the linearity thereof on a plane.

In order to achieve the above objects, the present invention provides a perspective projection calculation device in an image processor which includes at least one display, at least one frame buffer for storing an image to be displayed on the display, and at least one figure generator for generating a figure which composes the image on the frame buffer, thereby making a perspective correction on the respective pixels of the figure, wherein coefficients necessary and sufficient for perspective projection calculation are used as an interface to the figure generator.

In order to achieve the above objects, the present invention provides a perspective projection calculation device in an image processor which includes a depth buffer which stores data on a depth from a viewpoint for a plane to be displayed and which removes a hidden surface, the image processor perspectively projecting a triangle defined in a three-dimensional space onto a two-dimensional space and shading the triangle in the two-dimensional space, wherein the depth buffer comprises a buffer for storing a non-linear value in correspondence to the distance from the viewpoint.

The depth buffer may comprise a buffer for storing a non-linear value representing a resolution which increases toward the viewpoint in place of the depth value. More specifically, the depth buffer may comprise a buffer for storing the inverse of a depth value in place of the depth value.

In order to achieve the another object, the present invention provides a perspective projection calculation method in an image processing method for perspectively projecting a triangle defined in a three-dimensional space onto a two-dimensional space and for shading the triangle in the two-dimensional space, comprising the steps of:

calculating a coefficient which implies a plane slope element of the triangle defined in the three-dimensional space;

calculating an interpolation coefficient from the plane slope element coefficient; and making a perspective correction, using the interpolation coefficient.

The plane slope element coefficient may be used in common in all parameters to be interpolated.

An inverse matrix of a matrix of vertex coordinates of the triangle defined in the three-dimensional space may be used as the plane slope element coefficient.

In any perspective projection calculation device, the plane slope element coefficient, the interpolation coefficient and/or an interpolation expression including the interpolation coefficient may be used in common in the triangle defined in the three-dimensional space and/or in a perspectively projected triangle in a two-dimensional space.

The interpolation expression may involve only multiplication and/or addition.

The geometrical parameters may be interpolated in a three-dimensional space.

The interpolation expression may include a term involving a depth. More specifically, the inter-polation expression may use the inverses of depth coordinates as the geometrical parameters.

The interpolation calculation expression may interpolate the geometrical parameters while maintaining the linearity thereof on a plane.

In order to achieve the another object, the present invention provides a perspective projection calculation method in an image processing method which uses a depth buffer which stores data on a depth from a viewpoint for a plane to be displayed and which removes a hidden surface, a triangle defined in a three-dimensional space being perspectively projected onto a two-dimensional space and the triangle being shaded in the two-dimensional space, comprising the step of:

storing a non-linear value in the depth buffer in correspondence to the distance from the viewpoint.

The depth buffer may store a non-linear value representing a resolution which increases toward the viewpoint in place of the depth value. More specifically, the depth buffer may store an inverse of a depth value is stored in the depth buffer in place of the depth value.

In the present invention, a plane slope element coefficient in a three-dimensional space usable in common in a plurality of geometrical parameters necessary for shading a perspectively projected figure is used to reduce the number of dividing operations, and the plurality of geometrical parameters is corrected for each plane in the three-dimensional space. Thus, correct perspective correction is made rapidly.

BRIEF DESCRIPTION OF THE DRAWINGS

FIG. 13 illustrates an interpolation expression for s-components of depth and texture coordinates as typical interpolation expressions to be processed in the correction unit;

FIG. 14 shows a luminance calculation expression to be processed in the luminance calculation unit;

DESCRIPTION OF THE PREFERRED EMBODIMENT

Referring to FIGS. 1–9, 10A–10B, 11, 12A–12C, and 13–17, a preferred embodiment of a perspective projection calculation device and method according to the present invention will be described next.

Figure 1:
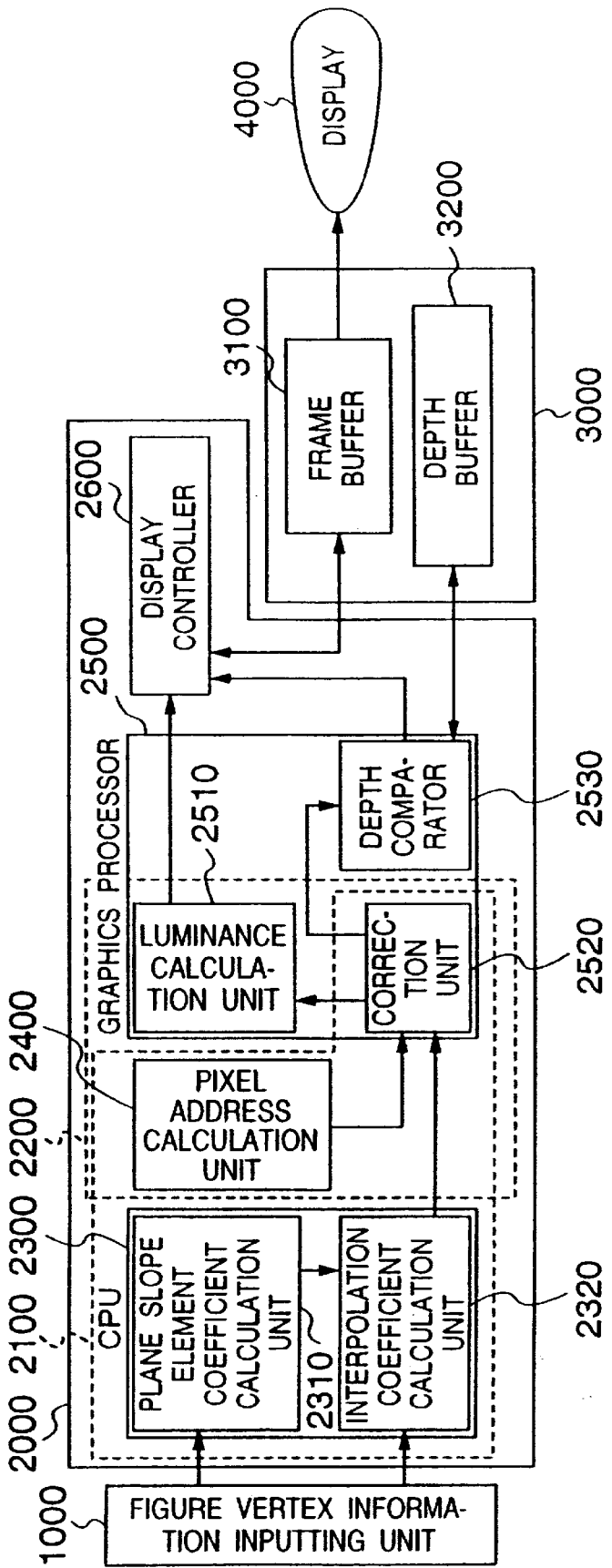
FIG. 1 is a block diagram of an illustrative image processing system which employs one embodiment of a perspective projection calculation device according to the present invention.

FIG. 1 is a block diagram of an illustrative image processing system which employs one embodiment of a perspective projection calculation device according to the present invention. The system is composed of a figure vertex information inputting unit 1000, an image processor 2000, a memory module 3000 and a display 4000. The image processor 2000 is composed of a perspective correction calculation unit 2100, and a figure generator 2200. The memory module 3000 is composed of a frame buffer 3100 and a depth buffer 3200.

Figure 2:
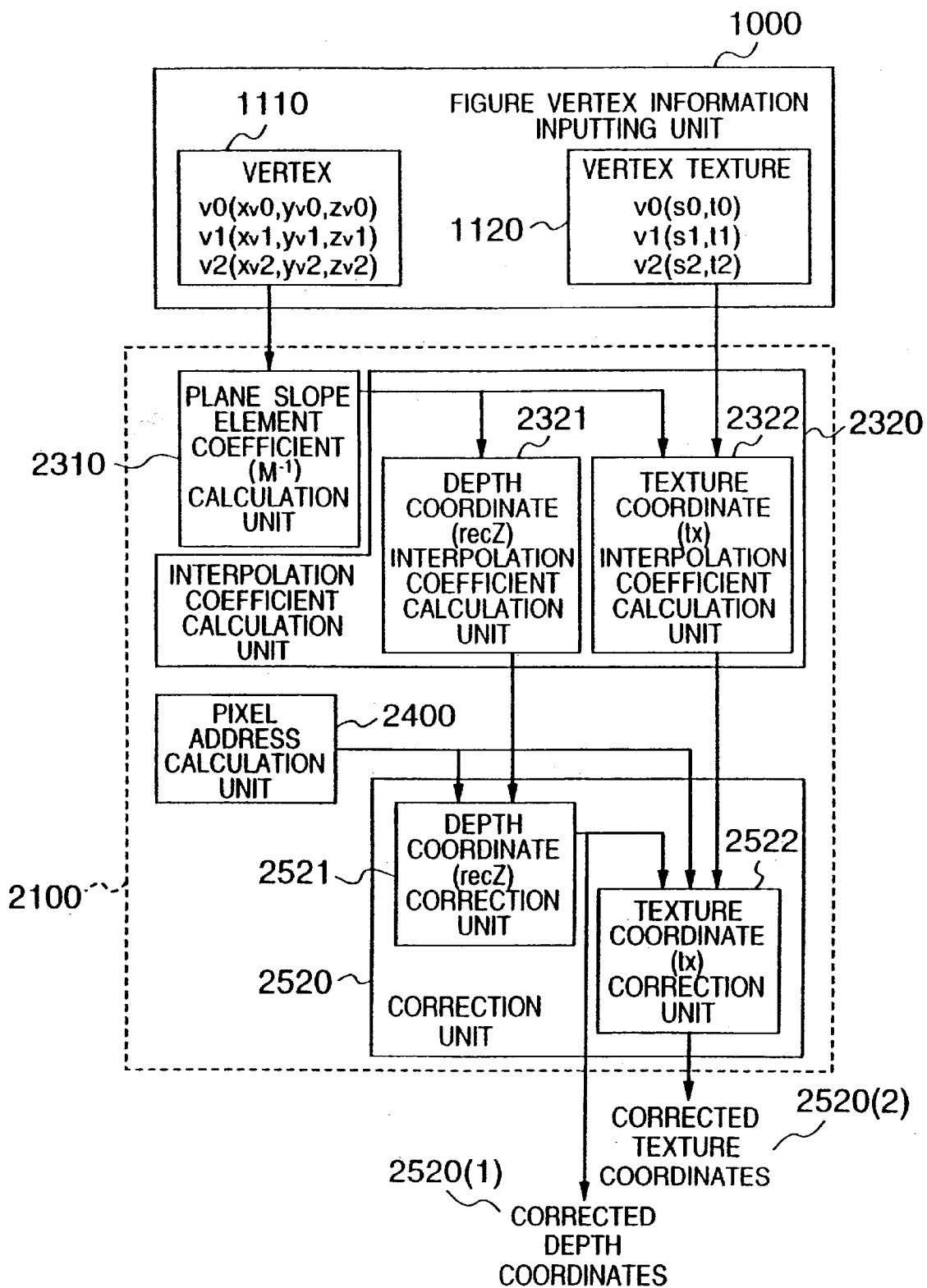
FIG. 2 is a block diagram of an illustrative perspective correction calculation unit.

FIG. 2 is a block diagram of the perspective correction calculation unit 2100, which makes a correction on the perspective projection and is composed of a plane slope element coefficient calculation unit 2310, an interpolation coefficient calculation unit 2320, a pixel address calculation unit 2400, and a correction unit 2520.

The interpolation coefficient calculation unit 2320 includes a depth coordinate interpolation coefficient calculation unit 2321 and a texture coordinate interpolation coefficient calculation unit 2322. The correction unit 2520 includes a depth coordinate correction unit 2521 and a texture coordinate correction unit 2522.

Figure 3:
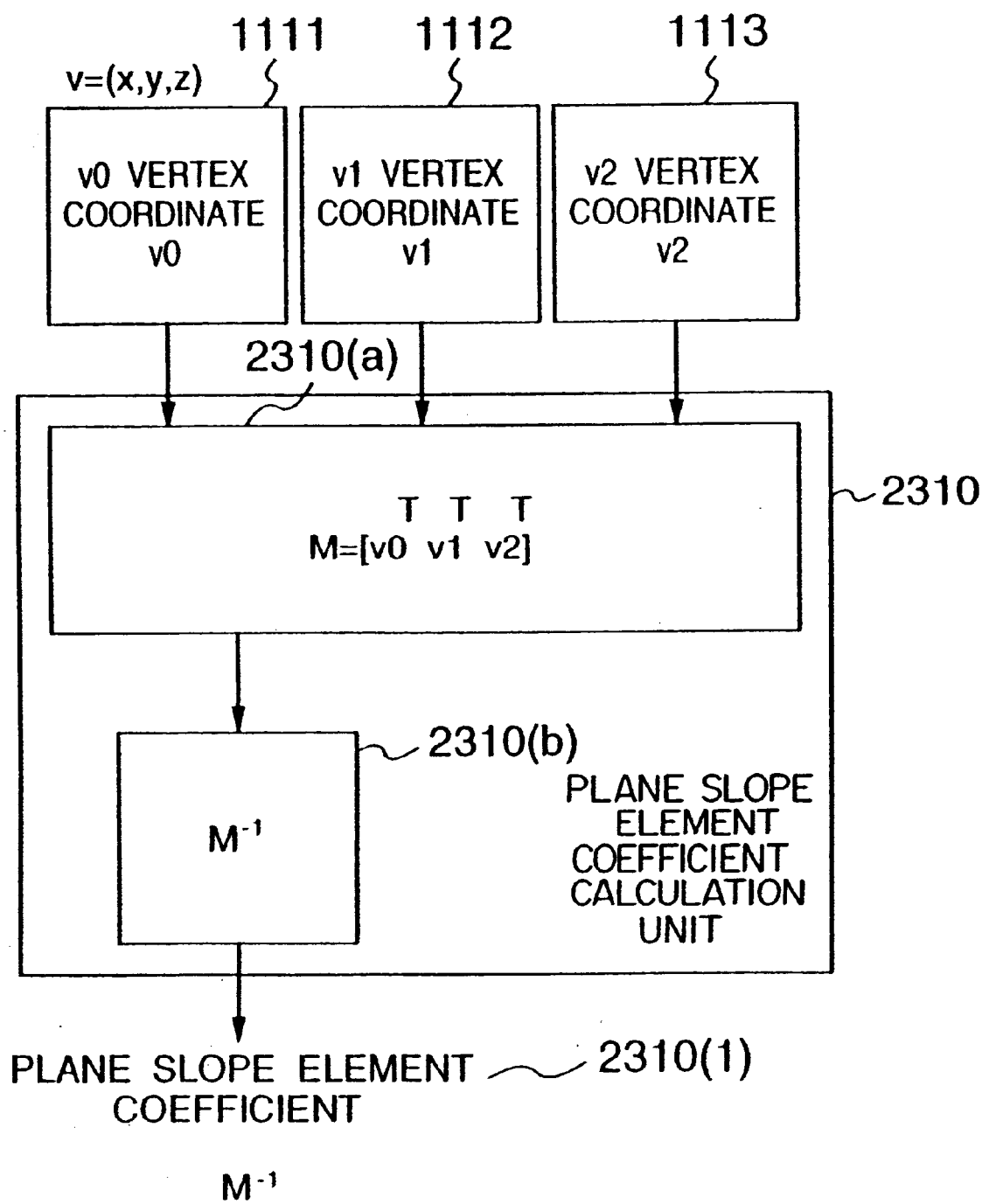
FIG. 3 is a block diagram of an illustrative plane slope element coefficient calculation unit which is a component of the perspective correction calculation unit.

FIG. 3 is a block diagram of the plane slope element coefficient calculation unit 2310 which is a component of the perspective correction calculation unit 2100. The plane slope element coefficient calculation unit 2310 receives figure vertex information from the figure vertex information inputting unit 1000. A vertex coordinate matrix composition unit 2310(*a*) composes a matrix based on the figure vertex information or the vertex coordinates (v0 vertex coordinates 1111, v1 vertex coordinates 1112, v2 vertex coordinates 1113) of a triangle defined in a three-dimensional space. An inverse matrix calculation unit 2310(*b*) calculates an inverse matrix or plane slope element coefficient 2310 (1) based on the earlier-mentioned matrix.

Figure 4:
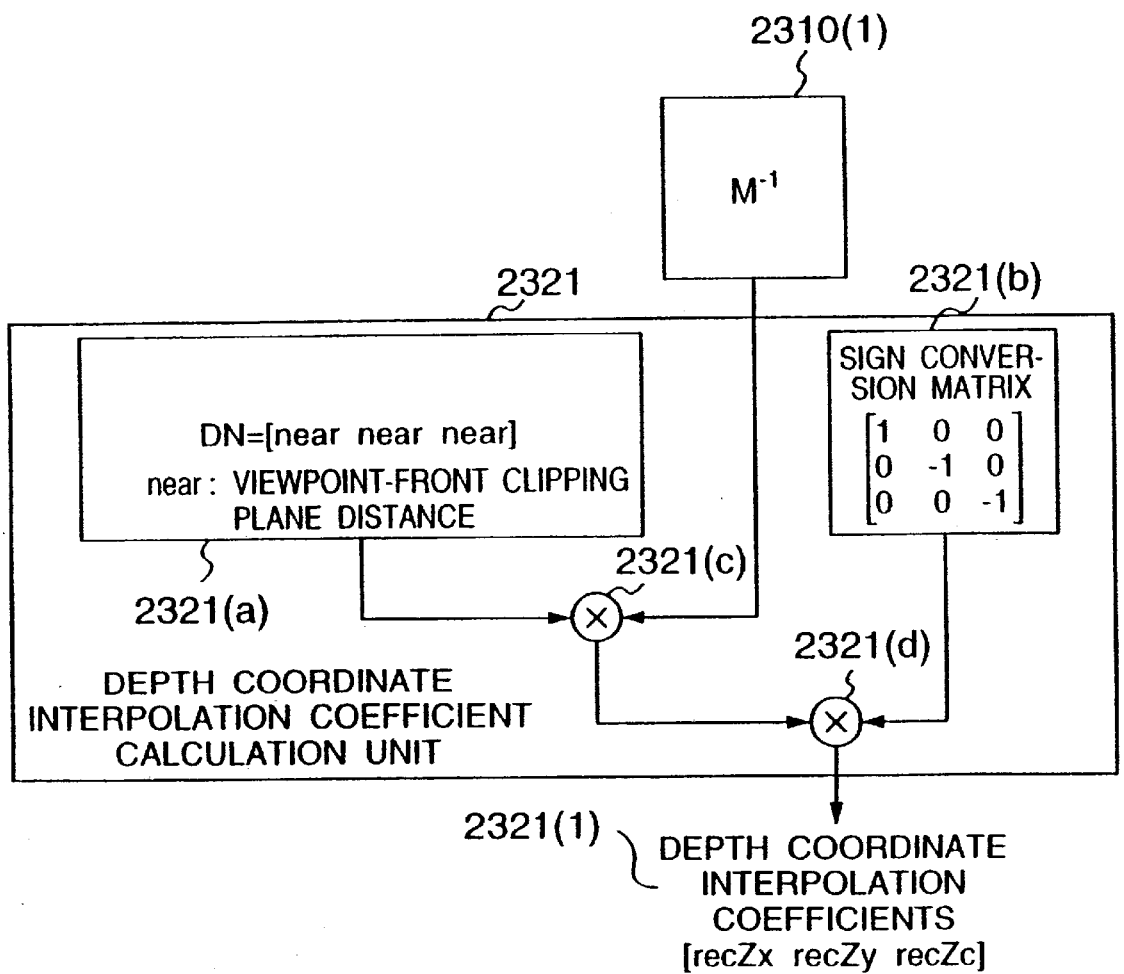
FIG. 4 is a block diagram of a depth coordinate interpolation coefficient calculation unit which is a component of an interpolation coefficient calculation unit.

FIG. 4 is a block diagram of an illustrative depth coordinate interpolation coefficient calculation unit 2321 which is a component of the interpolation coefficient calculation unit 2320. A depth coordinate matrix composition unit 2321(*a*) composes a matrix of viewpoint-front clipping plane distances. A multiplier 2321(*c*) multiplies a plane slope element coefficient 2310(*l*) calculated by the plane slope element coefficient calculation unit 2310 by the matrix of viewpoint-front plane clipping distances composed by the depth coordinate matrix composition unit 2321(*a*). A multiplier 2321(*d*) multiplies the output from the multiplier 2321(*c*) by a sign conversion matrix 2321(*b*) to calculate depth coordinate interpolation coefficients 2321(1). The sign conversion matrix 2321(*b*) implies conversion from a viewpoint coordinate system 1110*c* to a recZ coordinate system 1180*c*.

Figure 5:
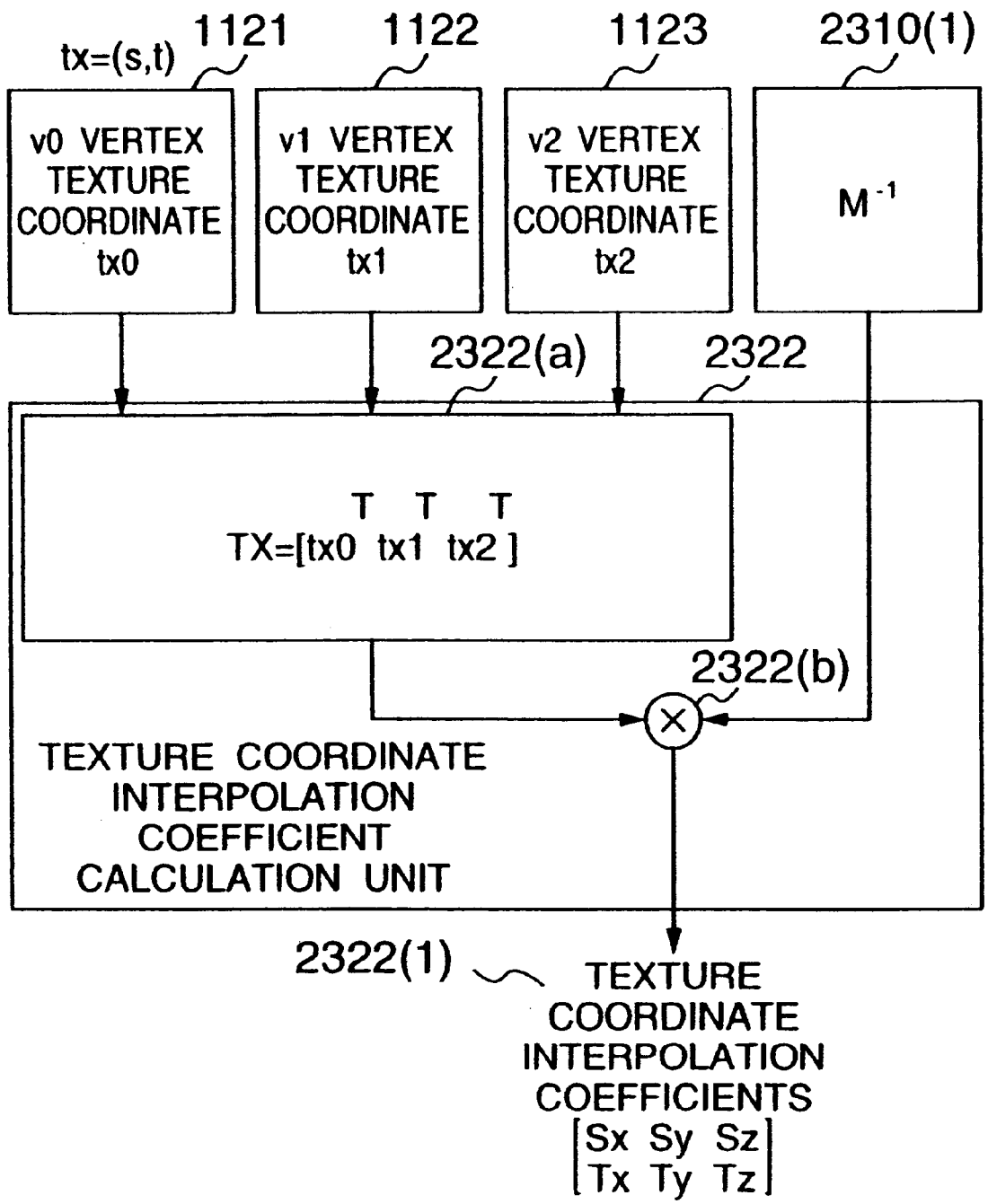
FIG. 5 is a block diagram of a texture coordinate interpolation coefficient calculation unit which is a component of the interpolation coefficient calculation unit.

FIG. 5 is a block diagram of an illustrative texture coordinate interpolation coefficient calculation unit 2322 which is a component of the interpolation coefficient calculation unit 2320. The texture coordinate interpolation coefficient calculation unit 2322 receives figure vertex information from the figure vertex information inputting unit 1000. A texture coordinate matrix composition unit 2322(*a*) composes a matrix based on figure vertex information or vertex texture coordinates (v0 vertex texture coordinates 1121, v1 vertex texture coordinates 1122, v2 vertex texture coordinates 1123) of a triangle defined in a three-dimensional space. A multiplier 2322(*b*) multiplies data on the matrix from the texture coordinate matrix composition unit 2322(*a*) by a plane slope element coefficient 2310(*l*) calculated by the plane slope element calculation unit 2310 to calculate texture coordinate interpolation coefficients 2322(*l*), which are composed of texture coordinate s-component interpolation coefficients and texture coordinate t-component interpolation coefficients.

Figure 6:
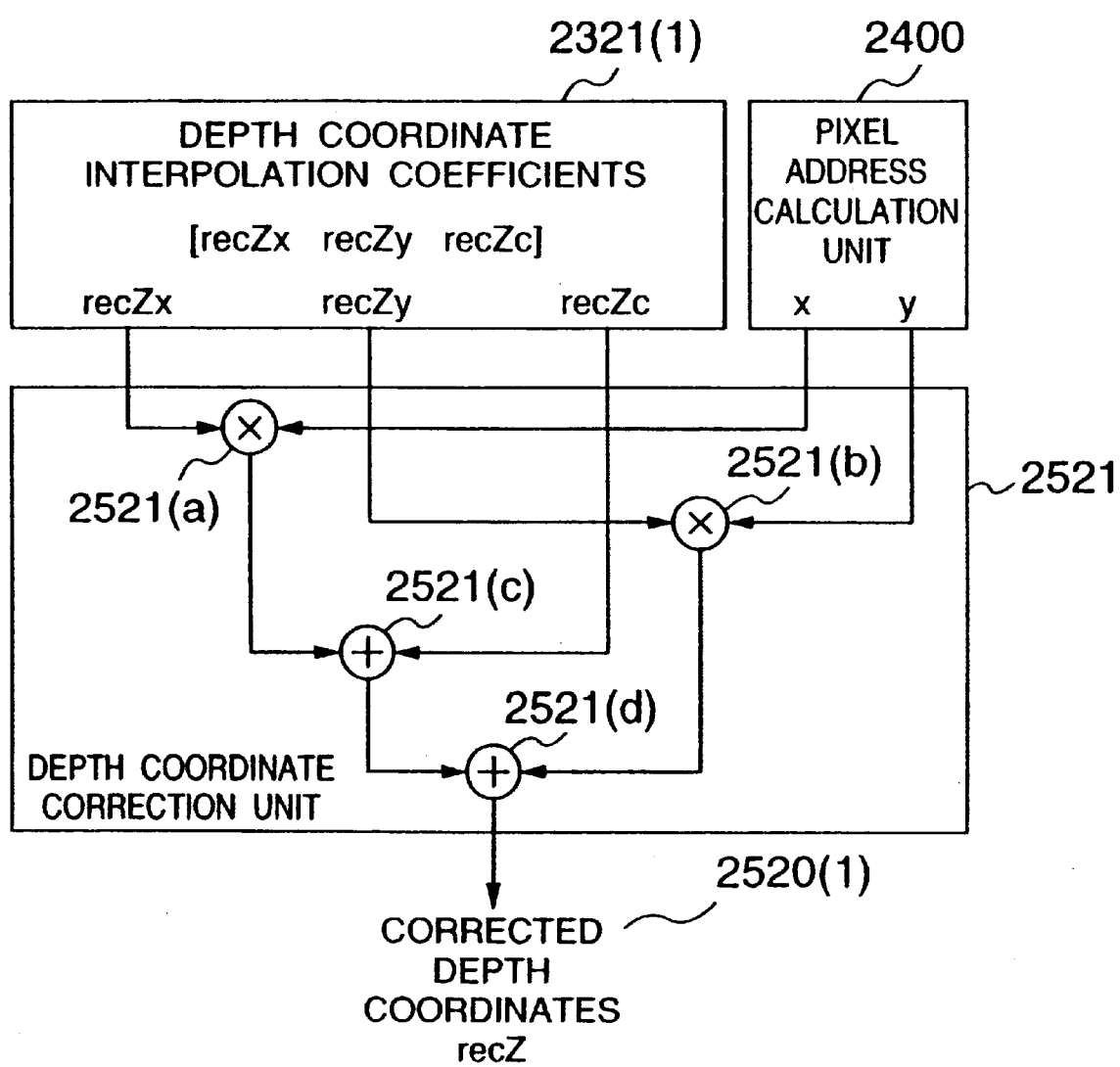
FIG. 6 is a block diagram of a depth coordinate correction unit which is a component of a correction unit.

FIG. 6 is a block diagram of the depth coordinate correction unit 2521 which is a component of the correction unit 2520. A multiplier 2521(*a*) multiplies an x-component of a depth coordinate interpolation coefficient 2321(1) by an x-component of an address generated by pixel address calculation unit 2400. An adder 2521(*c*) adds the output from the multiplier 2521(*a*) and a constant component of the depth coordinate interpolation coefficient 2321(1). A multiplier 2521(*b*) multiplies a y-component of the depth coordinate interpolation coefficient 2321(1) by a y-component of the address generated by the pixel address calculation unit 2400. Last, an adder 2521(*d*) adds the output from the adder 2521(*c*) and the output from the multiplier 2521(*b*) to calculate corrected depth coordinates 2520(1).

Figure 7:
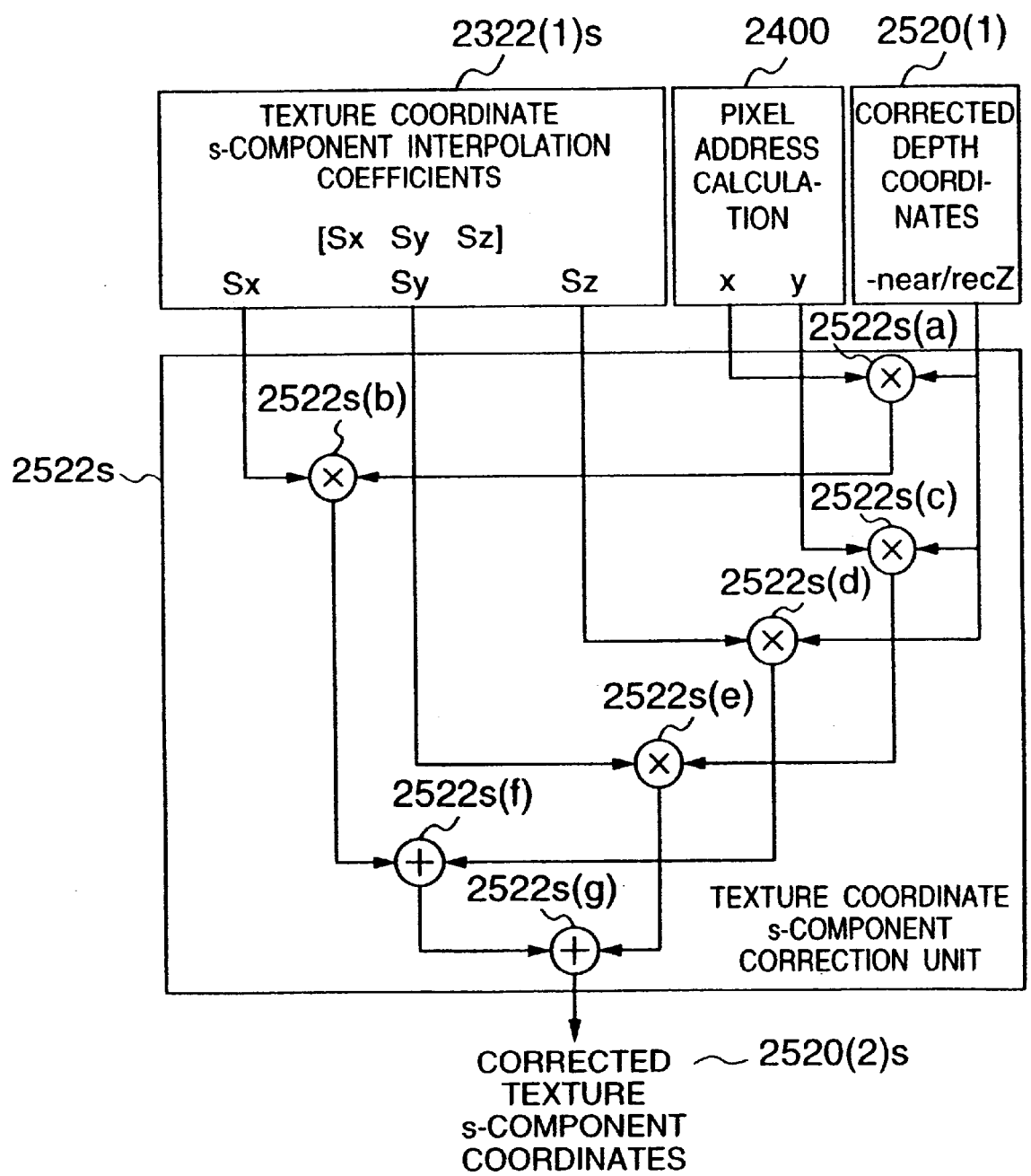
FIG. 7 is a block diagram of an illustrative texture coordinate s-component correction unit for an s-component of a texture coordinate correction unit as a component of the correction unit.

FIG. 7 is a block diagram of an illustrative texture coordinate s-component correction unit 2522*s* which is an s-component of the texture coordinate correction unit 2522 which is a component of the correction unit 2520. A multiplier 2522*s*(*a*) of the texture coordinate s-component correction unit 2522*s* multiplies an x-component of an address generated from the pixel address calculation unit 2400 by a value of −near/recZ calculated by the corrected depth coordinates 2520(1). A multiplier 2522*s*(*b*) multiples the output from the multiplier 2522*s*(*a*) by an x component of the texture coordinate s-component interpolation coefficient 2322(1)*s*. A multiplier 2522*s*(*c*) multiplies a y-component of the address generated from the pixel address calculation unit 2400 by the value of −near/recZ calculated from the corrected depth coordinates 2520(1). A multiplier 2522*s*(*e*) multiples the output from the multiplier 2522*s*(*c*) by a y-component of the texture coordinate s-component interpolation coefficient 2322(1)*s*. A multiplier 2522*s*(*d*) multiplies a z-component of the texture coordinate s-component interpolation coefficient 2322(1)*s* by the value of −near/recZ calculated by the corrected depth coordinates 2520(1). An adder 2522*s*(*f*) adds the outputs from the multipliers 2522*s*(*b*) and 2522*s*(*d*). Last, an adder 2522*s*(*g*) adds the outputs from the multiplier 2522*s*(*e*) and the adder 2522*s*(*f*) to calculate corrected texture s-component coordinates 2520(2)*s*.

Figure 8:
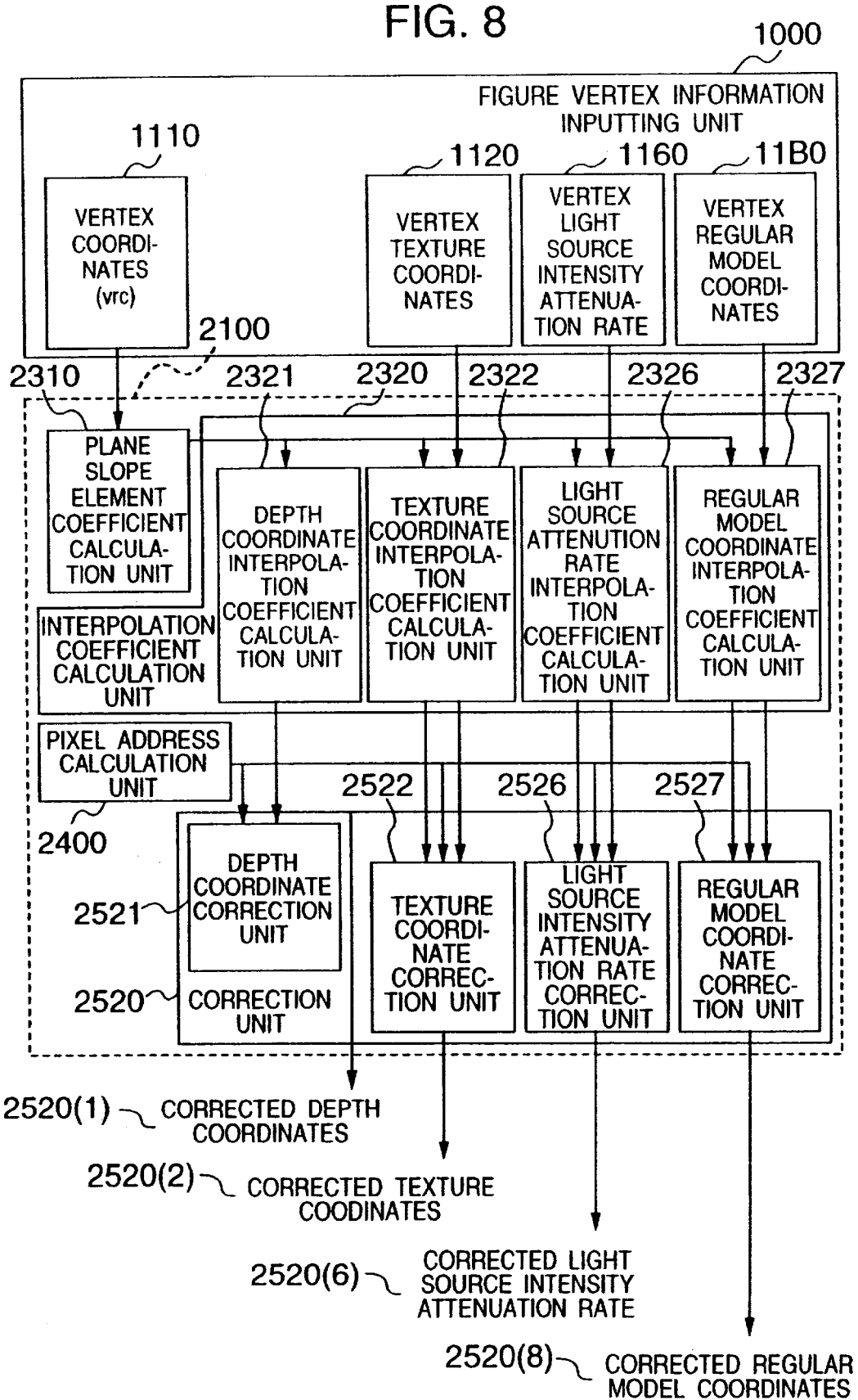
FIG. 8 is a block diagram of a modification of the perspective correction calculation unit of FIG. 2.

FIG. 8 is a block diagram of a modification of the perspective correction calculation unit 2100 of FIG. 2. The modification is arranged so as to handle geometrical parameters including vertex light source intensities whose linearities are maintained on a plane defined in a three-dimensional space, in addition to the depth coordinates and vertex texture coordinates. Geometrical parameters whose linearities are maintained on a plane defined in a three-dimensional space are correctable with respect to perspective projection in a manner similar to that in which the depth coordinates and vertex texture coordinates will be corrected.

In this case, perspective correction is made on a light source intensity attenuation rate necessary for luminance calculation, using a similar structure to that of FIG. 2. Perspective correction is made on a normal vector 1130, a light source direction vector 1140, a viewpoint direction vector 1190, and a light source reflection vector 1150 in a three-dimensional space where linearity of parameters on a plane is maintained. The space is referred to as a (u, v, w) space and its coordinate system is referred to as a normalized model coordinate system.

The procedures for processing the vertex coordinates and vertex texture coordinates of FIG. 8 are the same as those employed in FIG. 2. The light source intensity attenuation rate and vertex regular model coordinates which are modified geometrical parameters will be processed in a manner similar to that in which the vertex texture coordinates of FIG. 2 will be done.

In addition, in FIG. 8, perspective correction is made on geometrical parameters such as normals, depth coordinates, vertex texture coordinates, light source, and viewpoint necessary for calculation of luminance, using a structure similar to that of FIG. 2; more specifically, a light source intensity attenuation rate 1160 determined by the positional relationship between the light source and respective points in the figure, a normal vector 1130 indicative of the direction of the plane, a light source direction vector 1140 indicative of the direction of the light source, a viewpoint direction vector 1190 indicative of the direction of the viewpoint, and a light source reflection vector 1150 indicative of the reflecting direction of the light source. Perspective correction is made on the normal vector 1130, light source direction vector 1140, viewpoint direction vector 1190 and light reflection vector 1150 in a three-dimensional space in which linearity of parameters on a plane is maintained. The space and the coordinate system are referred to as a (u, v, r) space and a normalized model coordinate system, respectively. In the real perspective correction, the values (u, v, w), to which those vectors are converted, in the normalized model coordinate system in which those vectors can be linearly interpolated are used. For example, the coordinate values, in a normalized model coordinate system, of the vertexes of a triangle defined in the three-dimensional space are referred to as vertex normalized model coordinates.

Figure 9:
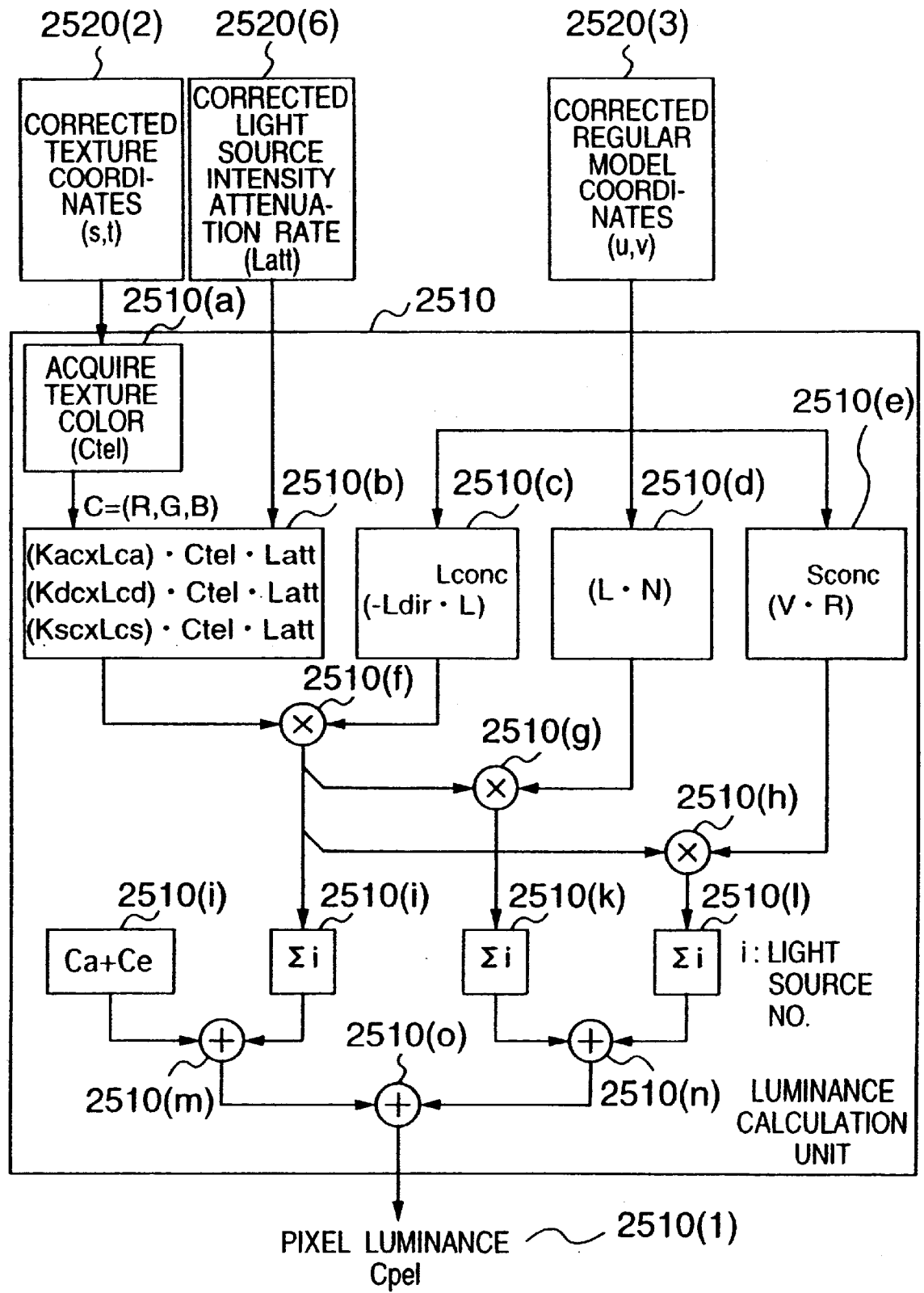
FIG. 9 is a block diagram of an illustrative luminance calculation unit which cooperates with a pixel address calculation unit and the correction unit to compose a figure generator.

FIG. 9 is a block diagram of an illustrative luminance calculation unit 2510 which cooperates with the pixel address calculation unit and correction unit 2520 to compose the figure generator 2200. A texture color acquirement unit 2510(a) acquires color data C=(R, G, B) which involve colors of the texture based on corrected texture coordinates 2520 (2). A light source-caused-attenuation-free ambient/diffusive/specular component luminance calculation unit 2510(b) calculates the luminances of a light source-caused-attenuation-free ambient/diffusive/specular components on the basis of the texture color and the corrected light source intensity attenuation rate. A spot angle attenuation rate calculation unit 2510(c) calculates an Lconc$^{th}$ power of the inner product (−Ldir·Li) of a reverse light source vector 11A0 and the light source direction vector 1140. A light source incident angle illumination calculation unit 2510(d) calculates the inner product (L·N) of the normal vector 1130 and the light source direction vector 1140.

A specular reflection attenuation rate calculation unit 2510(e) calculates a Sconc$^{th}$ power of the inner product (V·R) of the viewpoint direction vector 1190 and the light source reflection vector 1150 where Lconc is a spot light source intensity index and Sconc is a specular reflection index. A multiplier 2510(f) multiplies the output from the light source-caused-attenuation-free ambient/diffusive/specular component luminance calculation unit 2510(b) by the output from the spot angle attenuation rate calculation unit 2510(c). A multiplier 2510(g) multiplies the outputs from the multiplier 2510(f) by the light source incident angle illumination calculation unit 2510(d). A multiplier 2510(h) multiplies the output from the multiplier 2510(f) by the output from the specular reflection attenuation rate calculation unit 2510(e).

The above series of processing steps is performed by the number of light sources. A whole light source ambient component calculation unit 2510(j), a whole light source diffusive component calculation unit 2510(k), a whole light source specular component calculation unit 2510(1) each add the respective associated components by the number of light sources. Last, a luminance synthesis adder 2510(o) adds the output from the luminance calculation unit 2510(i) for a natural field ambient component and an emission component, the output from a whole light source ambient component calculation unit 2510(j), the output from a whole light source diffusive component calculation unit 2510(k), and the output from a whole light source specular component calculation unit 2510(1) to calculate a pixel luminance 2510(1).

Referring to FIGS. 10A–10B, 11, 12A–12C, and 13–17, the operation of the perspective projection calculation device, thus constructed, will be described next.

Figures 10A, 10B:
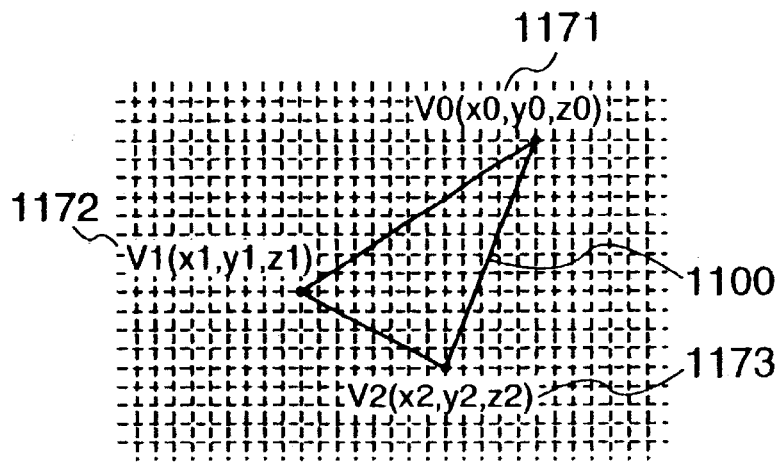
FIGS. 10A and 10B show a triangle displayed on a display.

FIG. 10A shows a triangle 1100 displayed on the display 4000. The triangle is the one in a two-dimensional space to which the corresponding triangle defined in the three-dimensional space is perspectively projected. FIG. 10B shows pdc 1170, rzc 1180, vrc 1110, texture 1120, light source intensity attenuation rate 1160, and regular model coordinates 11B0 at the vertexes of the triangle 1100 dis-played on the display 4000. The pdc 1170 denotes the coordinates of the triangle displayed on the display 4000, the rzc 1180 denote coordinates of the perspectively projected triangle, the vrc 1110 denotes coordinates of the triangle present before the perspective projection, the texture coordinates 1120 are those corresponding to a texture image mapped on the triangle, the light source intensity attenuation rates 1160 are scalar values determined depending on the positional relationship between the light source and respective points within the figure, and the regular model coordinates 11B0 are coordinate values in a regular model coordinate system which is a space in which the normal vector 1130, light source direction vector 1140, viewpoint direction vector 1190, and the light source reflection vector 1150 maintain their linearities on a plane in the three-dimensional space.

The pdc 1170c represents "Physical Device Coordinates", the rzc 1180c "recZ Coordinates", and the vrc 1110c "View Reference Coordinates". The recZ 1180z and the inverse of the depth coordinates are in proportional relationship on the vrc.

Figure 11:
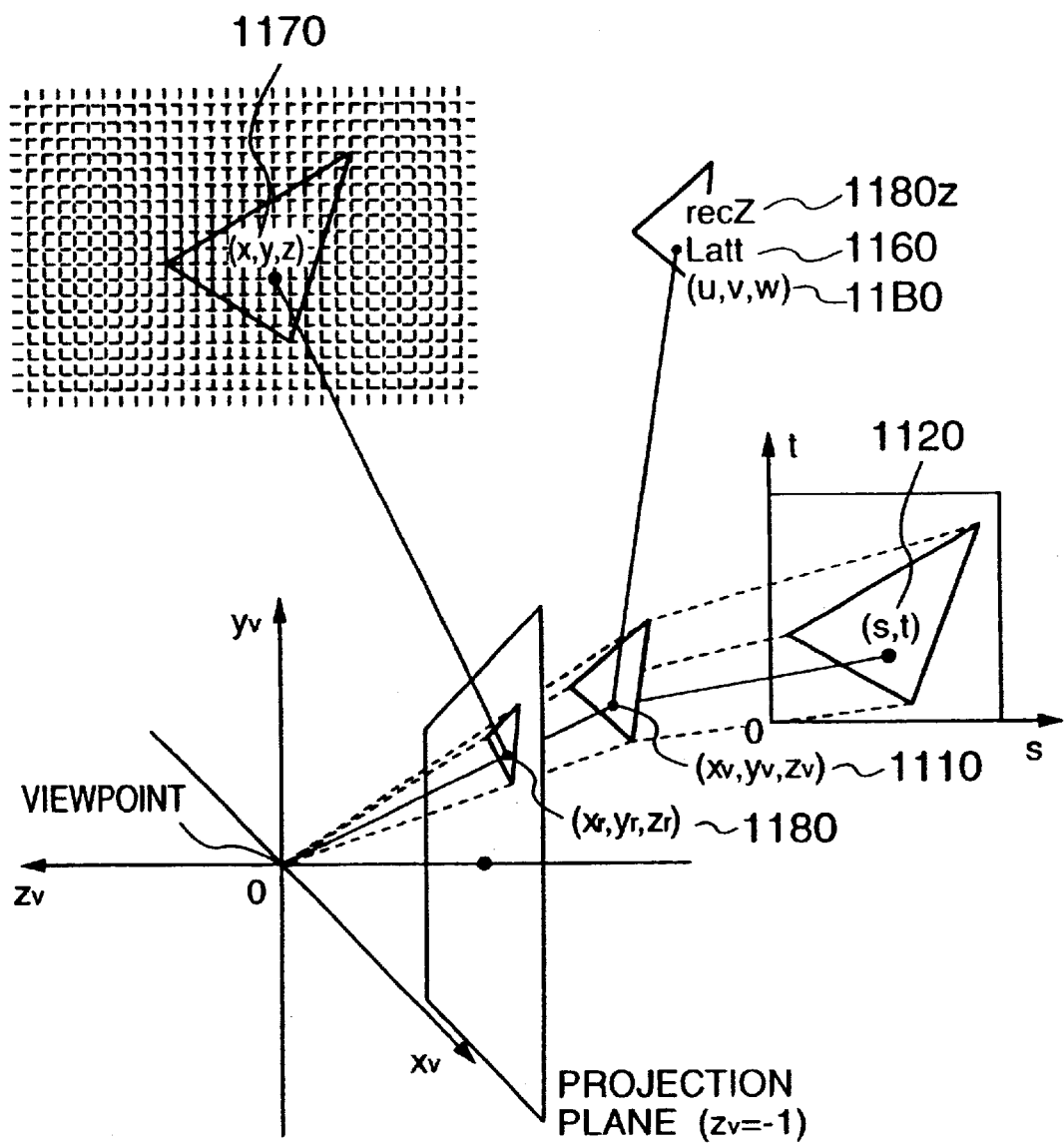
FIG. 11 shows the relationship between geometrical parameters and the corresponding triangles to be displayed.

FIG. 11 shows the relationship between geometrical parameters and a triangle to be displayed. At a point ($x_v$, $y_v$, $z_v$) 1110 within a triangle on the vrc 1110c, there are geometrical parameters which require correction for the perspective projection; i.e., depth coordinates 1180z, texture coordinates 1120, light source intensity attenuation rate 1160, and regular model coordinates 11B0. The point ($x_v$, $y_v$, $z_v$) 1110 in the triangle on the vrc 1110c is mapped onto a view plane by perspective projection to become a point ($x_r$, $y_r$, $z_r$) 1180 on the rzc 1180c. The mapped point on the rzc 1180c becomes a point (z, y, z) 1170 on the pdc 1170c on the display 4000.

Figures 12A, 12B, 12C:
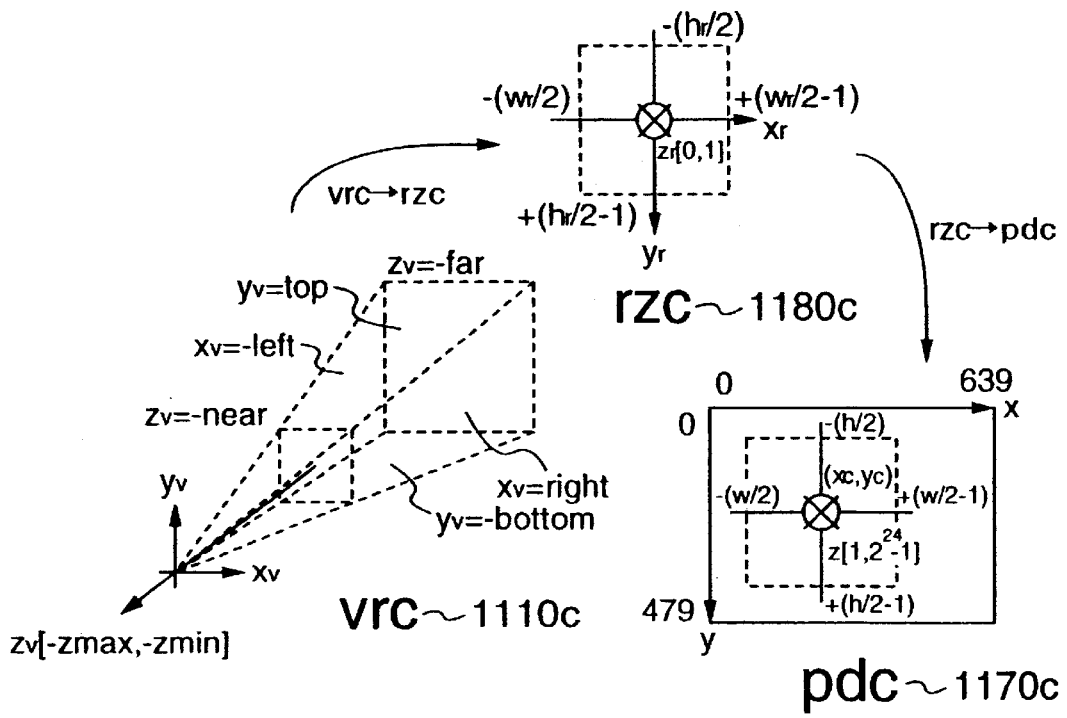
FIGS. 12A, 12B and 12C show the relationship between three kinds of coordinate systems and vrc 1110c/rzc 1180c/pdc 1170c.

FIGS. 12A, 12B, 12C show the relationship between the above-mentioned three kinds of coordinate systems and vrc 1110c/rzc 1180c/pdc 1170c. For the vrc 1110c representing the broken-lined volume with the equations in FIG. 12B, the viewpoint is at the origin. A figure model to be displayed is defined in this coordinate system. The rzc 1180c is the coordinate system obtained by subjecting the vrc 1110c to perspective projection which produces a sight effect similar to that produced by a human sight system. The relation between the rzc and the vrc is represented with the left side equations in FIG. 12C. The figure delineated onto the rzc 1180c is converted to the one on the pdc 1170c, which is then displayed on the display 4000. The relation between the pdc and the rzc is represented with the right side equations in FIG. 12C.

FIG. 13 shows interpolation expressions for a depth coordinate 2521(e) and a s-component 2522s(h) of texture coordinates as typical interpolation expressions to be processed in the correction unit 2520. The interpolated depth coordinates recz 2520 (1) in the rzc 1180c are given as:

$$recZ = recZx \cdot x_r + recZy \cdot y_r + recZc$$

where ($x_r$, $y_r$) is the rzc 1180 of a point to be interpolated, (recZx, recZy, recZc) denote depth coordinate interpolation coefficients 2321(1) calculated by the interpolation coefficient calculation unit 2320.

The texture coordinates 1120 have two components (s, t). The interpolated coordinates s2520(2)s of its s-component are given as:

$$s = (S_x \cdot x_r + S_y \cdot y_r + S_z \cdot z_v)$$

where ($x_r$, $y_r$) is the rzc 1180 of a point to be interpolated, ($S_x$, $S_y$, $S_z$) are texture coordinate s-component interpolation coefficients 2322(1)s calculated by the interpolation coefficient calculation unit 2320, $z_v$ is the depth vrc 1110 of the point to be interpolated and is obtained from the interpolated depth coordinate recZ 2520(1) in the rzc 1180c. The calculation expression in this embodiment is $Z_v$=−near/recz where "near" is the distance between the front clipping plane and a viewpoint at the vrc 1110c. The rzc 1180 of the point to be interpolated may be calculated from the pdc 1170 in accordance with a linear relation expression. Interpolation expressions for other geometrical parameters may be obtained in a manner similar to that in which the interpolation expression for the s-component of the texture coordinates 1120 is done.

FIG. 14 shows a luminance calculation expression to be processed by the luminance calculation unit 2510. The respective color components C of a pixel are below represented by the sum of the color Ca of a figure illuminated by ambient light present in a natural world, the color Ce of emission light radiated by the figure itself, the color Cai of a ambient reflection component from the figure illuminated by the light source, the color Cdi of diffusive reflection light component from the figure illuminated by the light source, and the color Csi of the specular reflection light component from the figure illuminated by the light source:

$$C=Ca+Ce+\Sigma(Cai+Cdi+Csi)$$

where C is composed of three components R, G and B, i is a light source number. Cai, Cdi and Csi are obtained as:

$$Cai=Ka \times Lai \times Ctel \times Latt \times (-Ldiri \cdot Li)\hat{}Lconc$$

$$Cdi=Kd \times Ldi \times Ctel \times Latt \times (-Ldiri \cdot Li)\hat{}Lconc \times (N \cdot Li)$$

$$Csi=Ks \times Lsi \times Ctel \times Latt \times (-Ldiri \cdot Li)\hat{}Lconc \times (V \cdot Ri)\hat{}Sconc$$

where (−Ldiri·Li), (N·Li) and (V·Ri) are each an inner product; Ka, Kb and Kc are each a reflection coefficient of a material; La, Ld and Ls are each the color of the light source; Ctel is the texture color; Latt is the light source intensity attenuation rate 1160; Ldir is the light source vector 11A0; L is the light source direction vector 1140; N is the normal vector 1130; V is the viewpoint direction vector 1190; R is the light source reflection vector 1150; Lconc is the spot light source intensity index; and Sconc is the specular reflection index.

Figure 15:
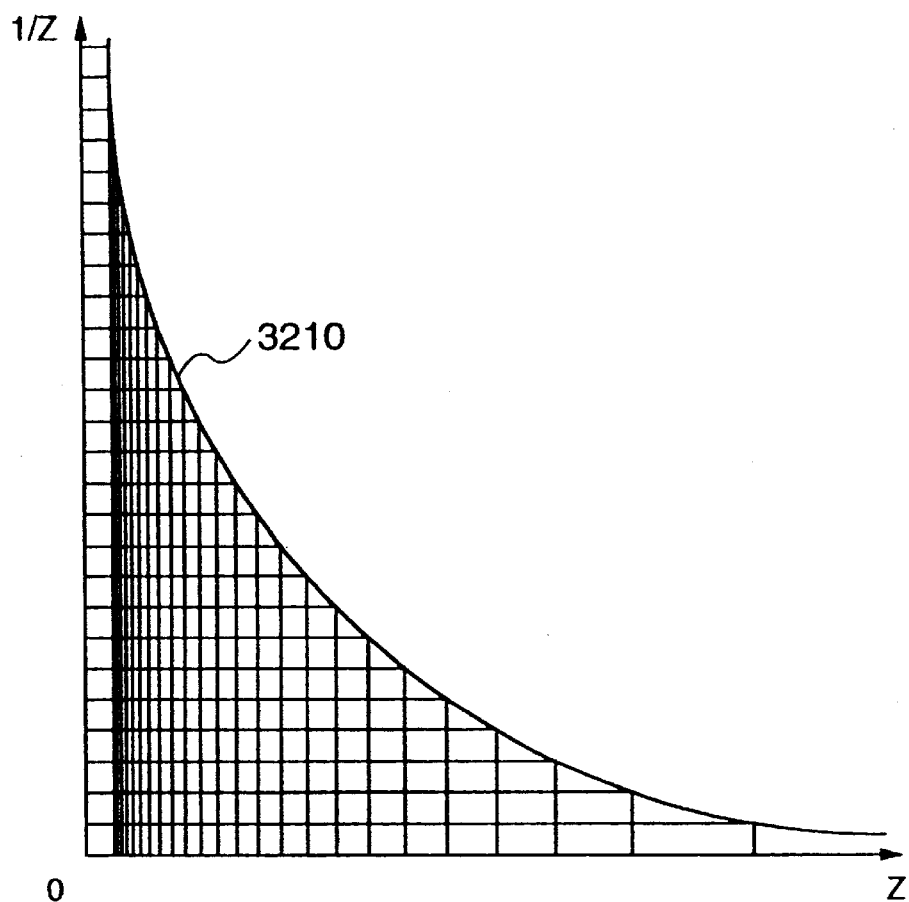
FIG. 15 is a graph of the relationship between the depth from a viewpoint of a triangle to be displayed and its inverse with z and 1/z values as parameters.

FIG. 15 is a graph 3210 of the relationship between depth from a viewpoint for a triangle to be displayed and the inverse of the depth value with z and 1/z values as parameters. The horizontal axis of this graph represents a z value as the depth and the vertical axis the inverse of z (i.e., 1/z).

Figure 16:
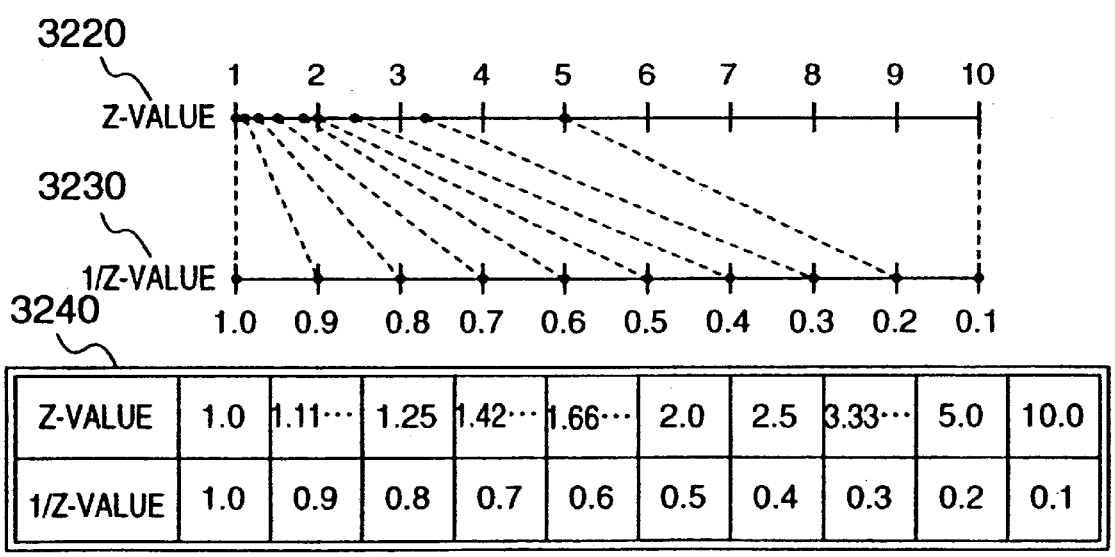
FIG. 16 shows z values for several 1/z values.

FIG. 16 shows several z values and corresponding 1/z values. A correspondence table 3240 for z and 1/z values shows z values obtained where 1/z values of from 0.1 to 1.0 are plotted at equal intervals. A z-value numerical straight line 3220 and a 1/z value numerical straight line 3230 represents the z-1/z value correspondence table 3240 in numerical straight lines.

Figure 17:
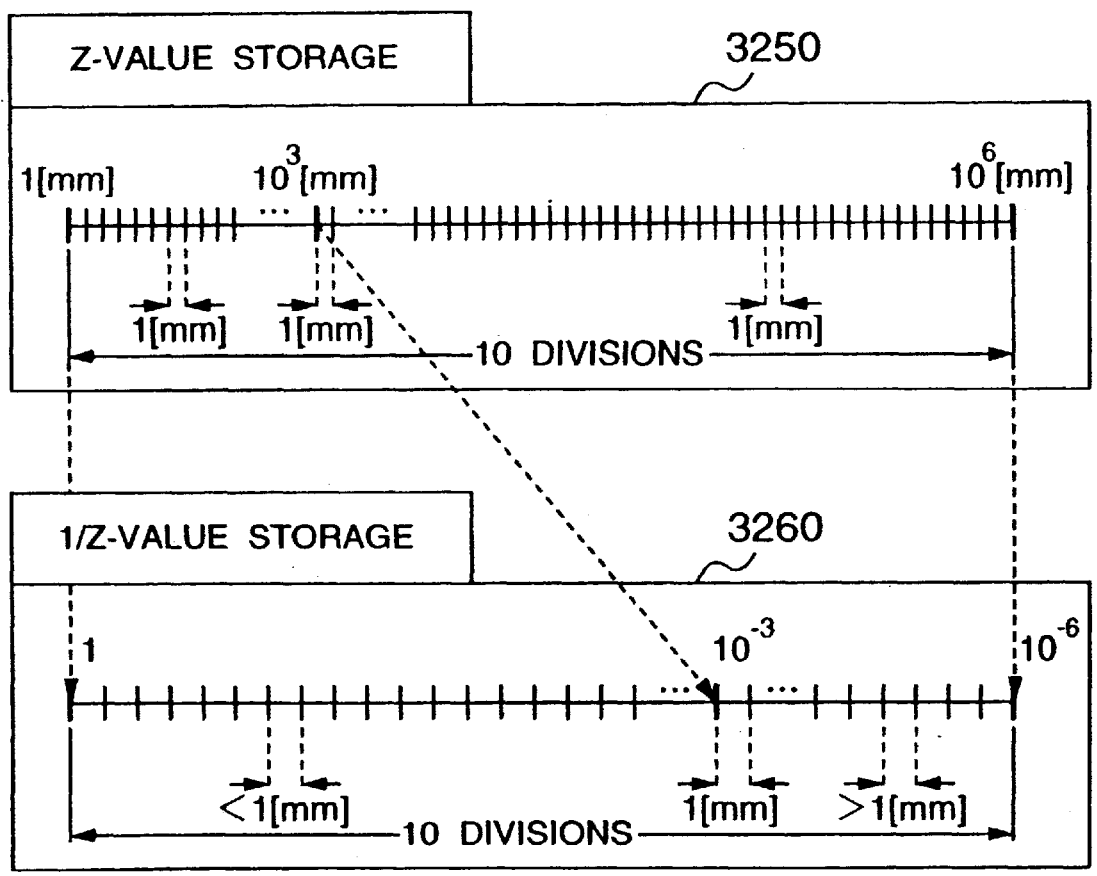
FIG. 17 shows the relationship between a case in which a z value is stored in a depth buffer and a case in which a 1/z value is stored in the depth buffer.

FIG. 17 shows the relationship between the case in which z values are stored in the depth buffer 3200 and the case in which 1/z values are stored in the depth buffer 3200. For example, consider a depth buffer 3250 which includes the depth buffer 3200 which has stored z values of from 1 mm to $10^6$ mm or 1000 m with a resolution of 1 mm. In this case, it will be easily understood that the depth buffer 3200 is required to be divided by at least $10^6$. It is obvious that the significance of 1 mm varies between the difference between 1 m+1 mm and 1 m+2 mm and the difference between 100 m+1 mm and 100 m+2 mm. More specifically, at a position near the viewpoint, an accurate depth value is needed whereas at a point remoter from the viewpoint, the difference of 1 mm is less significant. The 1/z value storage depth buffer 3260 includes the depth buffer 3200 in which 1/z values are stored to improve a resolution in an area near the viewpoint. It is obvious from FIGS. 15 and 16 that the resolution in an area near the viewpoint is improved when the 1/z values are stored in the depth buffer 3200. Dividing the depth buffer 3200 by 103 will suffice the assurance of a resolution of 1 mm for a depth value not more than $10^3$ mm or 1 m as the distance from the viewpoint as the requirements for storage of 1/z values in the depth buffer 3200. This example indicates that when depth values of from 1 mm to 106 mm or 1000 m are stored in the depth buffer, storage of 1/z values serves to reduce the size of the depth buffer advantageously to $\frac{1}{1000}$ (=$10^{3}/10^6$) compared to simple storage of the z values. As a result, for example, storage of 1/z values in the depth buffer 3200 only requires 16 bits/pixel whereas storage of z values in the depth buffer 3200 requires 24 bits/pixel.

Accurate perspective correction on the depth coordinates and texture coordinates 1120 will be described next on the basis of the description just mentioned above, by taking a triangle as an example of a figure. First, the figure vertex information inputting unit 1000 feeds the vrc 1110 of the triangle vertexes to the plane slope element coefficient calculation unit 2310 of the perspective correction calculation unit 2100, and texture coordinates 1120 corresponding to the triangle vertexes to the texture coordinate interpolation coefficient calculation unit 2322.

The plane slope element coefficient calculation unit 2310 calculates as a plane slope element coefficient 2310 (1) the inverse matrix of a matrix of vrc 1110 for given three vertexes. Let the respective vertexes of the triangle 1100 be v0, v1 and v2; let the corresponding pdc 1170 be (x0, y0, z0), (x1, y1, z1) and (x2, y2, z2); let rzc 1180 be ($x_r0$, $y_r0$, $z_r0$) ($x_r1$, $y_r1$, $z_r1$) and ($x_r2$, $y_r2$, $z_r2$); and let vrc 1110 be ($x_v0$, $y_v0$, $z_v0$), ($x_v1$, $y_v1$, $z_v1$), and ($x_v2$, $y_v2$, $z_v2$). A matrix M of vrc 1110 is given by Eq. 1 below. Since the plane slope element coefficient 2310 (1) is the inverse matrix of M of FIG. 1 below, it is given as Eq. 2 below:

$$M = \begin{bmatrix} x_v0 & x_v1 & x_v2 \\ y_v0 & y_v1 & y_v2 \\ z_v0 & z_v1 & z_v2 \end{bmatrix} \quad \text{(Eq. 1)}$$

$$M^{-1} = \begin{bmatrix} x_v0 & x_v1 & x_v2 \\ y_v0 & y_v1 & y_v2 \\ z_v0 & z_v1 & z_v2 \end{bmatrix}^{-1} \quad \text{(Eq. 2)}$$

The plane slope element coefficient 2310(1) implies the plane slope of the triangle defined in the three-dimensional space and is usable in common in a plurality of geometrical parameters. The plane slope element coefficients 2310(1), interpolation coefficients whose calculating procedures will be described below, and an interpolation expression composed of the interpolation coefficients are usable in common in the triangle.

The depth coordinate interpolation coefficient calculation unit 2321 calculates a depth coordinate interpolation coefficient 2321(1) based on the plane slope element coefficient 2310(1) while the texture coordinate interpolation coefficient calculation unit 2322 calculates a texture coordinate interpolation coefficient 2322(1) based on the information given above and the plane slope element coefficient 2310(1).

First, a process for calculating the depth coordinate interpolation coefficient 2321(1) will be described among the specified processes for calculating those interpolation coefficients. Assume now that the distance between the viewpoint and the view plane is 1 on the vrc, it will be seen that the perspective projection is represented in Eq. 3 below and that the perspectively projected coordinates are directly proportional to $1/z_v$. Now, recZ is defined as near/$(-z_v)$ where "near" is the distance between the viewpoint and the front clipping plane. Thus, if A which satisfies Eq. 4 below is obtained, the A is the depth coordinate interpolation coefficient 2321(1) represented by Eq. 5 below.

$$x_r = \frac{x_v}{(-z_v)/1}, \quad y_r = \frac{-y_v}{(-z_v)/1} \quad \text{(Eq. 3)}$$

$$[recZ] = A \begin{bmatrix} x_r \\ y_r \\ 1 \end{bmatrix} = [recZx \; recZy \; recZc] \begin{bmatrix} x_r \\ y_r \\ 1 \end{bmatrix} \quad \text{(Eq. 4)}$$

$$A = [recZx \; recZy \; recZc] \quad \text{(Eq. 5)}$$

$$= [recZ0 \; recZ1 \; recZ2] \begin{bmatrix} x_r0 & x_r1 & x_r2 \\ y_r0 & y_r1 & y_r2 \\ 1 & 1 & 1 \end{bmatrix}^{-1}$$

$$= \left[ -\frac{near}{z_v0} \; -\frac{near}{z_v1} \; -\frac{near}{z_v2} \right] \begin{bmatrix} x_r0 & x_r1 & x_r2 \\ y_r0 & y_r1 & y_r2 \\ 1 & 1 & 1 \end{bmatrix}^{-1}$$

$$= [near \; near \; near] \begin{bmatrix} -\frac{1}{z_v0} & 0 & 0 \\ 0 & -\frac{1}{z_v1} & 0 \\ 0 & 0 & -\frac{1}{z_v2} \end{bmatrix}$$

$$\begin{bmatrix} x_r0 & x_r1 & x_r2 \\ y_r0 & y_r1 & y_r2 \\ 1 & 1 & 1 \end{bmatrix}^{-1}$$

$$= [near \; near \; near] \begin{bmatrix} -z_v0 & 0 & 0 \\ 0 & -z_v1 & 0 \\ 0 & 0 & -z_v2 \end{bmatrix}^{-1}$$

$$\begin{bmatrix} x_r0 & x_r1 & x_r2 \\ y_r0 & y_r1 & y_r2 \\ 1 & 1 & 1 \end{bmatrix}^{-1}$$

$$= [near \; near \; near]$$

$$\left\{ \begin{bmatrix} x_r0 & x_r1 & x_r2 \\ y_r0 & y_r1 & y_r2 \\ 1 & 1 & 1 \end{bmatrix} \begin{bmatrix} -z_v0 & 0 & 0 \\ 0 & -z_v1 & 0 \\ 0 & 0 & -z_v2 \end{bmatrix} \right\}^{-1}$$

$$= [near \; near \; near]$$

$$\begin{bmatrix} -x_r0 \cdot z_v0 & -x_r1 \cdot z_v1 & -x_r2 \cdot z_v2 \\ -y_r0 \cdot z_v0 & -y_r1 \cdot z_v1 & -y_r2 \cdot z_v2 \\ -z_r0 \cdot z_v0 & -z_r1 \cdot z_v1 & -z_r2 \cdot z_v2 \end{bmatrix}^{-1}$$

-continued $$= [near \; near \; near] \begin{bmatrix} x_v0 & x_v1 & x_v2 \\ -y_v0 & -y_v1 & -y_v2 \\ -z_v0 & -z_v1 & -z_v2 \end{bmatrix}^{-1}$$

$$= [near \; near \; near]$$

$$\left\{ \begin{bmatrix} 1 & 0 & 0 \\ 0 & -1 & 0 \\ 0 & 0 & -1 \end{bmatrix} \begin{bmatrix} x_v0 & x_v1 & x_v2 \\ y_v0 & y_v1 & y_v2 \\ z_v0 & z_v1 & z_v2 \end{bmatrix} \right\}^{-1}$$

$$= [near \; near \; near]$$

$$\begin{bmatrix} x_v0 & x_v1 & x_v2 \\ y_v0 & y_v1 & y_v2 \\ z_v0 & z_v1 & z_v2 \end{bmatrix}^{-1} \begin{bmatrix} 1 & 0 & 0 \\ 0 & -1 & 0 \\ 0 & 0 & -1 \end{bmatrix}^{-1}$$

$$= [near \; near \; near]$$

$$\begin{bmatrix} x_v0 & x_v1 & x_v2 \\ y_v0 & y_v1 & y_v2 \\ z_v0 & z_v1 & z_v2 \end{bmatrix}^{-1} \begin{bmatrix} 1 & 0 & 0 \\ 0 & -1 & 0 \\ 0 & 0 & -1 \end{bmatrix}$$

Next, the texture coordinate interpolation coefficients 2322(1) will be described next. In order to reflect the influence of the perspective projection accurately on the coefficients 2322(1), the texture coordinates are corrected in the three-dimensional space. If B which satisfies Ex. 6 below is calculated, it becomes the texture coordinate interpolation coefficient 2322(1) represented by Eq. 7 below. (Eq. 7)

$$\begin{bmatrix} s \\ t \end{bmatrix} = B \begin{bmatrix} x_v \\ y_v \\ z_v \end{bmatrix} = \begin{bmatrix} Sx & Sy & Sz \\ Tx & Ty & Tz \end{bmatrix} \begin{bmatrix} x_v \\ y_v \\ z_v \end{bmatrix} \quad \text{(Eq. 6)}$$

$$B = \begin{bmatrix} Sx & Sy & Sz \\ Tx & Ty & Tz \end{bmatrix} = \begin{bmatrix} s0 & s1 & s2 \\ t0 & t1 & t2 \end{bmatrix} \begin{bmatrix} x_v0 & x_v1 & x_v2 \\ y_v0 & y_v1 & y_v2 \\ z_v0 & z_v1 & z_v2 \end{bmatrix}^{-1} \quad \text{(Eq. 7)}$$

The depth coordinates 2520(1) obtained after correction are calculated from coordinates produced by the pixel address calculation unit 2400 and to be corrected by perspective projection and the depth coordinate interpolation coefficient 2321(1) calculated before in accordance with the next interpolation expression:

recZ=recZx×x$_r$+recZy×y$_r$+recZc2521(e).

In the actual processing for the depth, the depth coordinates themselves are not used and the inverse values of the depth coordinates are handled instead. The texture coordinate 2520(2)s obtained after correction for the texture s-component is calculated from the coordinates produced by the pixel address calculation unit 2400 and to be corrected by perspective projection, the above calculated texture coordinate interpolation coefficient 2322(1), and the corrected depth coordinate 2520(1) in accordance with the next interpolation expression:

s=(Sx×x$_r$+S$_y$×y$_r$+Sz)×zv2522s(h).

As described above, the geometrical parameters are interpolated in the three-dimensional space and effects due to perspective projection for shading are accurately expressed.

A plurality of geometrical parameters other than the depth coordinates and texture coordinates 1120 may be processed in a manner similar to that used for the texture coordinates 1120 to achieve perspective correction. Its structure is already shown in FIG. 8.

Since correction on geometrical parameters in the coordinates which were produced by the pixel address calculation unit 2400 and which should be subjected to perspective correction has been made, luminance calculation is performed on the basis of the corrected geometrical parameters in the luminance calculation unit 2510. A method of making the luminance calculation is already described above.

Data on the colors calculated in the luminance calculation unit 2510 are fed to the display controller 2600. Data on the corrected depth coordinate 2520 (1) are fed to a depth comparator 2530. In that case, the inverse values themselves of the depth coordinates obtained from an interpolation expression below by allowing for the compression of the depth buffer 3200 are fed to the depth comparator 2530:

$$recz = recZx \cdot x + recZy \cdot y + recZc \, 2521(e).$$

The depth coordinates stored in the depth buffer 3200 are compared with the corrected depth coordinates 2520(1). When the conditions are satisfied, the corrected depth coordinates 2520(1) are transferred to the depth buffer 3200. The display controller 2600 may (or may not) write the color data into a frame buffer 3100 and displays the color data on the display 4000, on the basis of the information from the luminance calculation unit 2510, depth comparator 2530, and frame buffer 3100. When this series of processes is performed for all the points within the triangle, the processing for the triangle is completed.

While in the embodiment, phong shading with texture mapping to which accurate perspective correction has been made has been illustrated, the use of colors at the triangle vertexes as geometrical parameters brings about Gouraud Shading which has subjected to accurate perspective correction.

While as the geometrical parameters four kinds of data; the depth coordinates, texture coordinates 1120, light source intensity attenuation rate 1160, and regular model coordinates 11B0 have been named, similar perspective correction can be made on any geometrical parameters as long as the parameters' linearities are maintained on a plane in the three-dimensional space.

While in the embodiment 1/z values or recz which are the inverses of the depth coordinates are illustrated as being stored in the depth buffer 3200, z values which are solely depth coordinates may be stored instead. Values alternative to non-linear depth values such as improve a resolution of depth values in a region near the viewpoint may be stored.

Since the perspective projection calculation device according to the present invention includes the plane slope element coefficient calculation unit which calculates coefficients which imply a plane slope of a triangle defined in the three-dimensional space usable in common in a plurality of geometrical parameters to be interpolated, the interpolation coefficient calculation unit which calculates interpolation coefficients from the plane slope element coefficients obtained in the plane slope element coefficient calculation unit, and the correction unit which makes accurate perspective corrections, using the interpolation coefficients obtained in the interpolation coefficient calculation unit, the perspective projection calculation device is capable of accurately making perspective corrections rapidly for each plane while avoiding an increase in the number of dividing operations.

What is claimed is:

1. An image processing system for perspectively projecting a triangle defined in a three-dimensional space onto a two-dimensional space and shading the triangle in the two-dimensional space, the image processing system comprising:

a memory which stores at least inverses of depth coordinates; and an image processor which
   calculates a plane slope element coefficient which implies a plane slope element of the triangle defined in the three-dimensional space,
   calculates an interpolation coefficient from the plane slope element coefficient, and
   makes a perspective correction using the interpolation coefficient and inverses of depth coordinates stored in the memory.

2. An image processing system according to claim 1, wherein the image processor outputs inverses of depth coordinates for storage in the memory in advance.

3. An image processing system according to claim 1, further comprising a display for displaying a result of the perspective correction.

4. An image processing system according to claim 1, wherein the image processor outputs a result of the perspective correction for storage in the memory.

5. An image processing system for perspectively projecting a triangle defined in a three-dimensional space onto a two-dimensional space and shading the triangle in the two-dimensional space, the image processing system comprising:

a memory which stores at least inverses of depth coordinates;

a CPU which
   calculates a plane slope element coefficient which implies a plane slope element of the triangle defined in the three-dimensional space, and
   calculates an interpolation coefficient from the plane slope element coefficient; and a graphics processor which makes a perspective correction using the interpolation coefficient and inverses of depth coordinates stored in the memory.

6. An image processing system according to claim 5, wherein the graphics processor outputs inverses of depth coordinates for storage in the memory in advance.

7. An image processing system according to claim 5, further comprising a display for displaying a result of the perspective correction.

8. An image processing system according to claim 5, wherein the graphics processor outputs a result of the perspective correction for storage in the memory.

* * * * *